(12) United States Patent
Rallapalli et al.

(10) Patent No.: US 9,536,225 B2
(45) Date of Patent: *Jan. 3, 2017

(54) AGGREGATING BUSINESS ANALYTICS ARCHITECTURE AND CONFIGURATOR

(71) Applicant: International Business Machines Corporation, Armonk, NY (US)

(72) Inventors: Murthy V. Rallapalli, Alpharetta, GA (US); Barry S. Rosen, Bedford, MA (US); Daniel B. Sutherland, Colorado Springs, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/002,499

(22) Filed: Jan. 21, 2016

(65) Prior Publication Data

US 2016/0140500 A1 May 19, 2016

Related U.S. Application Data

(63) Continuation of application No. 14/331,923, filed on Jul. 15, 2014, now Pat. No. 9,251,490, which is a
(Continued)

(51) Int. Cl.
*G06F 9/44* (2006.01)
*G06Q 10/10* (2012.01)
(Continued)

(52) U.S. Cl.
CPC .......... *G06Q 10/101* (2013.01); *G06Q 10/067* (2013.01); *G06Q 10/0637* (2013.01);
(Continued)

(58) Field of Classification Search
CPC ............... G06Q 10/06; G06F 8/20; G06F 8/10
(Continued)

(56) References Cited

U.S. PATENT DOCUMENTS 6,697,824 B1 * 2/2004 Bowman-Amuah G06F 17/3089
707/E17.116
7,191,429 B2 3/2007 Brassard et al.
(Continued)

OTHER PUBLICATIONS

Office Action (Jan. 2, 2015) for U.S. Appl. No. 14/331,923, filed Jul. 15, 2014.
(Continued)

*Primary Examiner* — Hang Pan
*Assistant Examiner* — Hui-Wen Lin
(74) *Attorney, Agent, or Firm* — Schmeiser, Olsen & Watts LLP; Michael Petrocelli

(57) ABSTRACT

A method and associated system for designing an architectural solution. Functional requirements and nonfunctional requirements are received. Responsive to receiving the functional requirements and nonfunctional requirements, first level outputs are produced. Further input is received through a guided questionnaire, wherein the guided questionnaire is based on the first level outputs. Responsive to receiving the further input, a list of client specific components and subcomponents, a client specific solution reference architecture, and a set of reference links are produced.

6 Claims, 9 Drawing Sheets

Related U.S. Application Data continuation of application No. 13/607,325, filed on Sep. 7, 2012, now Pat. No. 8,813,022.

(51) Int. Cl.
*G06Q 10/06* (2012.01)
*G06Q 50/08* (2012.01)

(52) U.S. Cl.
CPC ....... *G06Q 10/06316* (2013.01); *G06Q 10/10* (2013.01); *G06Q 50/08* (2013.01)

(58) Field of Classification Search
USPC ....................................................... 717/102
See application file for complete search history.

(56) References Cited

U.S. PATENT DOCUMENTS

| | | |
|---|---|---|
| 7,275,024 B2 | 9/2007 | Yeh et al. |
| 7,716,254 B2 | 5/2010 | Sarkar et al. |
| 8,019,638 B1 | 9/2011 | Uhl et al. |
| 8,813,022 B2 | 8/2014 | Rallapalli et al. |
| 2006/0178918 A1* | 8/2006 | Mikurak ................. G06Q 10/06 705/7.25 |
| 2006/0184410 A1* | 8/2006 | Ramamurthy ......... G06Q 10/10 706/8 |
| 2007/0061354 A1* | 3/2007 | Sarkar .................... G06Q 10/06 |
| 2007/0061534 A1 | 3/2007 | Takata et al. |
| 2008/0155535 A1 | 6/2008 | Daniels |
| 2011/0055802 A1 | 3/2011 | von Unwerth et al. |
| 2014/0074557 A1 | 3/2014 | Rallapalli et al. |
| 2014/0351023 A1 | 11/2014 | Rallapalli et al. |

OTHER PUBLICATIONS

Amendment (Mar. 19, 2015) for U.S. Appl. No. 14/331,923, filed Jul. 15, 2014.
Final Office Action (Jul. 6, 2015) for U.S. Appl. No. 14/331,923, filed Jul. 15, 2014.
Final Amendment (Sep. 3, 2015) for U.S. Appl. No. 14/331,923, filed Jul. 15, 2014.
Notice of Allowance (Sep. 25, 2015) for U.S. Appl. No. 14/331,923, filed Jul. 15, 2014.

* cited by examiner

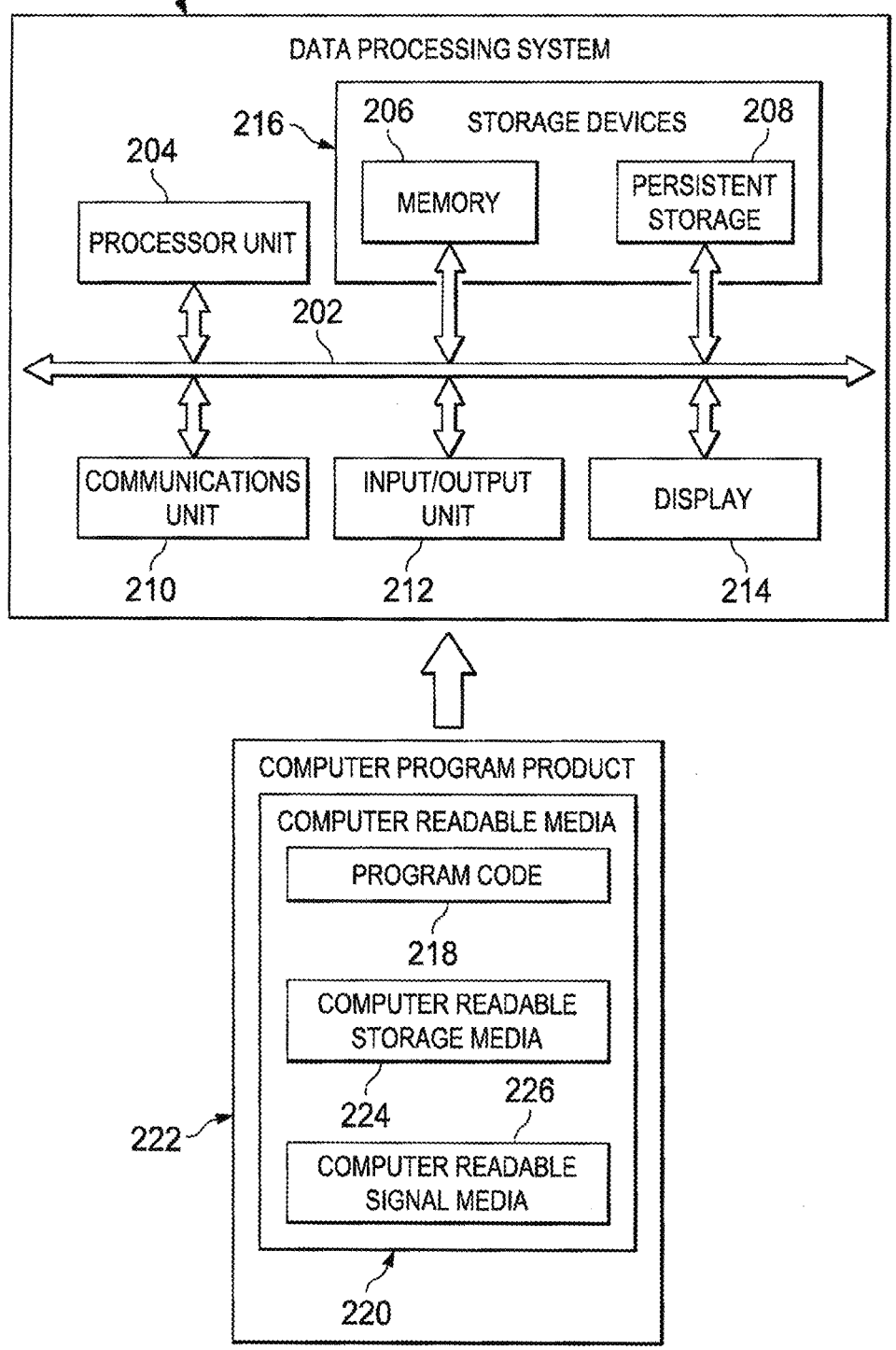

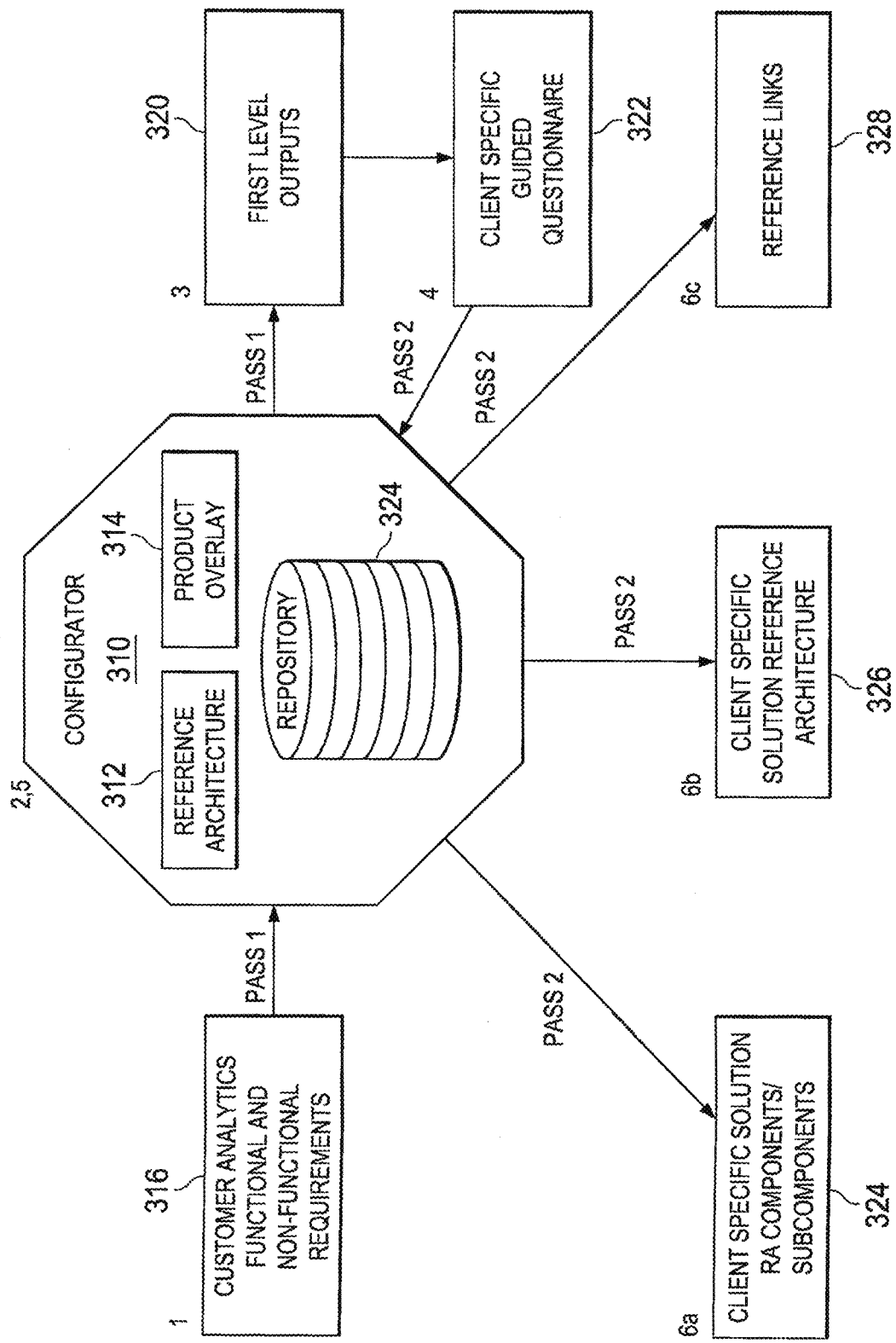

FIG. 5A

| SOURCES 510 | CONTENT MANAGEMENT 512 | MASTER DATA MANAGEMENT 514 | DATA INTEGRATION 516 |
|---|---|---|---|
| - DB2 z/OS<br>- DB2 LUW<br>- IMS<br>- INFORMIX<br>- VSAM | -CLASSIFICATION MODULE<br>-CONTENT ANALYZER<br>-CONTENT COLLECTOR<br>-CONTENT INTEGRATOR<br>-CONTENT MANAGER<br>-CONTENT MANAGER OnDemand<br>-DATACAP<br>-DOCUMENT MANAGER<br>-ENTERPRISE RECORDS<br>-FileNet CAPTURE<br>-FileNet CONTENT SERVICES<br>-FileNet CONTENT MANAGER<br>-FileNet P8<br>-ENTERPRISE CONTENT MANAGEMENT<br>-WebSphere INFORMATION INTEGRATOR CONTENT EDITION<br>-OmniFind<br>-RECORDS MANAGER | -InfoSphere IDENTITY INSIGHT SOLUTIONS<br>-InfoSphere MASTER INFORMATION HUB<br>-InfoSphere MDM SERVER<br>-InfoSphere MDM SERVER FOR PIM<br>-InfoSphere TRACEABILITY SERVER<br>-INITIATE MASTER DATA SERVICE | -INFORMATION SERVER<br>-InfoSphere DataStage<br>-InfoSphere DataStage DTS (TRANSACTIONAL)<br>-InfoSphere CHANGE DATA CAPTURE<br>-InfoSphere FEDERATION SERVER<br>-InfoSphere QUALITY STAGE<br>-IBM GLOBAL NAME RECOGNITION (GNR)<br>-IBM MASHUP CENTER<br>-InfoSphere STREAMS<br>-WebSphere PROCESS SERVER<br>-WebSphere MESSAGE BROKER<br>-COGNOS 8 VIRTUAL VIEW MANAGER<br>-COGNOS DATA MANAGER<br>-InfoSphere FOUNDATION TOOLS |

| DATA REPOSITORIES 518 | BI/PERFORMANCE MONITORING 520 | ADVANCED ANALYTICS 522 | ACCESS 524 |
|---|---|---|---|
| -BIG INSIGHTS (APACHE HADOOP)<br>-DB2 LUW<br>-DB2 z/OS<br>-FileNet CONTENT MANAGER<br>-CONTENT MANAGER<br>-IBM BANKING DATA WAREHOUSE (BDW)<br>-IBM FINANCIAL MARKETS DATA WAREHOUSE<br>-IBM INSURANCE INFORMATION WAREHOUSE (IIW)<br>-IBM RETAIL DATA WAREHOUSE<br>-IBM TELECOMMUNICATIONS DATA WAREHOUSE (TDW)<br>-IDS<br>-IMS<br>-INFORMIX TimeSeries DataBlade<br>-InfoSphere WAREHOUSE<br>-ISAS<br>-NETEZZA<br>-OPTIM DATA GROWTH<br>-InfoSphere DATA ARCHITECT<br>-SolidDP | -COGNOS BI<br>-COGNOS NOW!<br>-COGNOS PLANNING<br>-COGNOS TM1<br>-e-Discovery ANALYZER<br>-FileNet SYSTEM MONITOR<br>-IBM CLASSIFICATION MODULE<br>-IBM MASHUP CENTER<br>-iLOG<br>-InfoSphere CUBING SERVICES<br>-SPSS<br>-IBM BUSINESS MONITOR<br>-WebSphere PORTAL<br>-WebSphere sMash | -COGNOS<br>-COREMETRICS<br>-iLOG<br>-InfoSphere GLOBAL NAME ANALYTICS<br>-SPSS<br>-TM1<br>-UNICA ENTERPRISE | -BUSINESS GLOSSARY ANYWHERE<br>-COGNOS ANALYSIS FOR EXCEL<br>-COGNOS ANALYTICAL APPLICATIONS<br>-COGNOS CONTROLLER<br>-COGNOS GO! MOBILE<br>-COGNOS GO! OFFICE<br>-COGNOS GO! SEARCH<br>-e-Discovery MANAGER<br>-InfoSphere<br>-eDiscovery MANAGER<br>-OmniFind ENTERPRISE EDITION<br>-OmniFind SEARCH<br>-WebSphere PORTAL |

FROM FIG. 5A

TO FIG. 5D

AGGREGATING BUSINESS ANALYTICS ARCHITECTURE AND CONFIGURATOR

CROSS REFERENCE TO RELATED APPLICATION

This application is a continuation application claiming priority to Ser. No. 14/331,923, filed Jul. 15, 2014, now U.S. Pat. No. 9,251,490, issued Feb. 2, 2016, which is a continuation of Ser. No. 13/607,325, filed Sep. 7, 2012, U.S. Pat. No. 8,813,022, issued Aug. 19, 2014.

BACKGROUND

1. Field

The disclosure relates generally to a computer implemented method, a computer program product, and a data processing system for designing an architectural solutions. More specifically, disclosure relates to a computer implemented method, a computer program product, and a data processing system for designing an architectural solution within the constraints of a business analytics and optimization reference architecture and customer information technology environment.

2. Description of the Related Art

As businesses increasingly rely upon computer technology to perform essential functions, data mining is rapidly becoming vital to business success. Specifically, many businesses gather various types of data about the business and/or its customers so that operations can be gauged and optimized. Typically, a business will gather data into a database or the like and then utilize a data mining model to analyze the data.

Unfortunately, many companies are unable to flexibly integrate data analytics into business processes because of the complexity, expense, and incomprehensibility often involved. For example, in terms of infrastructure; companies often must invest substantial resources to build data warehouses, implement servers, hire "mining experts" and information technology staff to use mining software, etc. In terms of processes; companies must then spend considerable time mapping and tuning between data and mining functions. To this extent, business analysts are typically required to possess the mining domain knowledge to choose the best mining algorithm and select appropriate data. In general, there can be more than twenty technically oriented parameters to tune and map. However, in reality, business analysts might know their data and business objectives well, but might not have an in-depth knowledge of the mining algorithm and/or the tuning parameters.

In fact, very few segments in industry have the human and financial resources to deploy sophisticated data analytics solutions such as data mining and scoring. Basically to deploy data mining techniques, companies have two choices: (1) acquire data mining tools and hire an industry specialist to prepare the environment and set up the tool to be used; or (2) hire external consultants to avoid the lack of skills, and large investments in infrastructure companies. Both cases are an extremely expensive proposition for most companies due to the complexity of data integration and the tight binding of complex models to the analytics process.

However, the data analytics collected are closely dependent upon the software products used in the collection process. Matching specific software products to the problems faced by business as well as the type of data collected is often the determining factor in providing useful data analytics.

SUMMARY

According to embodiments of the present invention, a computer implemented method is provided for designing an architectural solution. Functional requirements and nonfunctional requirements of the architectural solution are received. Responsive to receiving the functional requirements and nonfunctional requirements, first level outputs are produced. Further input is received through a guided questionnaire based on the first level outputs. Responsive to receiving the further input, a list of client specific components and subcomponents, a client specific solution reference architecture, and a set of reference links is produced.

According to embodiments of the present invention, a data processing system, is provided for designing an architectural solution. The computer system comprises one or more processors, one or more computer-readable memories and one or more computer-readable, tangible storage devices. Program instructions, stored on at least one of the one or more storage devices for execution by at least one of the one or more processors via at least one of the one or more memories are provided for receiving functional requirements and nonfunctional requirements of the architectural solution. Program instructions, stored on at least one of the one or more storage devices for execution by at least one of the one or more processors via at least one of the one or more memories are provided, responsive to receiving the functional requirements and nonfunctional requirements, for producing first level outputs. Program instructions, stored on at least one of the one or more storage devices for execution by at least one of the one or more processors via at least one of the one or more memories are provided for receiving further input through a guided questionnaire based on the first level outputs. Program instructions, stored on at least one of the one or more storage devices for execution by at least one of the one or more processors via at least one of the one or more memories are provided, responsive to receiving the further input, for producing a list of client specific components and subcomponents, a client specific solution reference architecture, and a set of reference links.

According to embodiments of the present invention, a computer program product is provided for designing an architectural solution. The computer program product comprises one or more computer-readable, tangible storage devices. Program instructions, stored on at least one of the one or more storage devices are provided for receiving functional requirements and nonfunctional requirements of the architectural solution. Program instructions, stored on at least one of the one or more storage devices are provided, responsive to receiving the functional requirements and nonfunctional requirements, for producing first level outputs. Program instructions, stored on at least one of the one or more storage devices are provided for receiving further input through a guided questionnaire based on the first level outputs. Program instructions, stored on at least one of the one or more storage devices are provided, responsive to receiving the further input, for producing a list of client specific components and subcomponents, a client specific solution reference architecture, and a set of reference links.

BRIEF DESCRIPTION OF THE SEVERAL VIEWS OF THE DRAWINGS

FIG. 2 is an illustration of a data processing system depicted in accordance with an illustrative embodiment;

FIG. 3 is a data flow diagram for designing an architectural solution within the constraints of a business analytics and optimization reference architecture and customer information technology environment according to an illustrative embodiment;

FIGS. 5A, 5B, 5C and 5D is a product overlay according to an illustrative embodiment.

DETAILED DESCRIPTION

Figure 1:
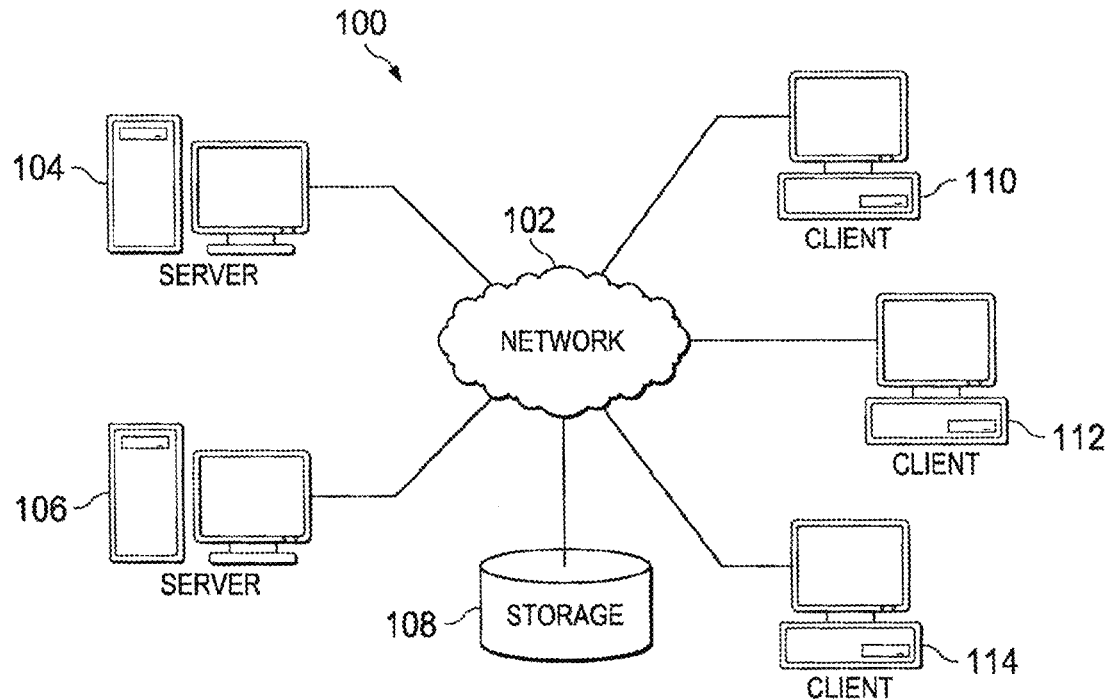
FIG. 1 is an illustrative diagram of a data processing environment in which illustrative embodiments may be implemented.

As will be appreciated by one skilled in the art, aspects of the present invent on may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Turning now to FIG. 2, an illustration of a data processing system is depicted in accordance with an illustrative embodiment. Data processing system 200 may be a server computer such as server computer 104 and server computer 106 of FIG. 1. Data processing system 200 may also be a client computer, such as client computers 110, 112, and 114 of FIG. 1. In this illustrative example, data processing system 200 includes communications framework 202, which provides communications between processor unit 204, memory 206, persistent storage 208, communications unit 210, input/output (I/O) unit 212, and display 214. In these examples, communications framework 204 may be a bus system.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, and program code in functional form, and/or other suitable information on either a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications with either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer, Display 214 provides a mechanism to display information to a user.

Instructions for the operating system, applications, and/or programs may be located in storage devices 216, which are in communication with processor unit 204 through communications framework 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218 rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using comp er readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured later or may be permanently configured to perform the number of operations. Examples of programmable logic devices include, for example, a programmable logic array, programmable array logic, afield programmable logic array, afield programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data or transmit and receive data. A communications unit may be, for example, a modem or a network adapter, two network adapters, or some combination thereof. Further, a memory may be, for example, memory 206, or a cache, such as found in an interface and memory controller hub that may be present in communications framework 202.

The illustrative embodiments described herein provide a computer implemented method, a computer program product, and a data processing system for designing an architectural solution within the constraints of a business analytics and optimization reference architecture and customer information technology environment. A computer implemented method, a data processing system, and a computer program product are provided for designing an architectural solution. Functional requirements and nonfunctional requirements of the architectural solution are received. Responsive to receiving the functional requirements and nonfunctional requirements, first level outputs are produced. Further input is received through a guided questionnaire based on the first level outputs. Responsive to receiving the further input a list of client specific components and subcomponents, a client specific solution reference architecture, and a set of reference links is produced.

Referring now to FIG. 3, a data flow diagram for designing an architectural solution within the constraints of a business analytics and optimization reference architecture and customer information technology environment is shown according to an illustrative embodiment. Data flow 300 is a software process that can be implemented in a data processing system, such as data processing system 200 of FIG. 2.

Configurator 310 is a software engine for designing an architectural solution within the constraints of a business analytics and optimization reference architecture and customer information technology environment. Based on a customer's analytic functional and nonfunctional requirements, as well as indicated specific client situations, configurator 310 provides an efficient, "best practice", and client specific industry based architectural solution using the current business analytics and optimization Reference Architecture. Configurator 310 further provides a corresponding architecture overlay of client specific components and subcomponents required. Configurator 310 further provides a corresponding page of reference links to items such as but not limited to Points of View, Accelerators, Best Practices, and key performance indicators.

According to an illustrative embodiment, configurator 310 translates user input from an online business analytics and optimization requirements focused questionnaire. A Decision Tree/Knowledge/Rules Engine within the configurator using an associated proprietary architectural model persisted in the repository, translates user input from the online business analytics and optimization requirements focused questionnaire into one or multiple decision trees. The decision trees drive query paths against the proprietary architectural model persisted in the repository to produce client specific architectural output.

Configurator 310 is based on reference architecture 312. Reference architecture 312 is a predefined architectural pattern, or set of patterns, possibly partially or completely instantiated, designed, and proven for use in particular business and technical business analytics and optimization contexts, together with supporting artifacts to enable use of the architectural pattern, or set of patterns.

Configurator 310 is based on product overlay 314. Product overlay 314 is a representation of the various available products is utilized to implement various layers of reference architecture 312. Based on customer functional and non-functional requirements as well as further input received through a guided questionnaire (4) based on the first pass of configurator output, configurator 310 can recommend available products for designing an architectural solution within the constraints of a business analytics and optimization reference architecture and customer information technology environment.

Configurator 310 receives customer functional and non-functional requirements 316 through interface 318. Based on customer functional and nonfunctional requirements 316, Configurator 310 produces first level outputs 320. First level outputs 320 include those reference architecture pillars and layers of reference architecture 312 that may be applicable in creating an architectural solution based on functional and nonfunctional requirements 316 received from the customer.

Based on first level outputs 320, Configurator 310 prompts the customer for additional input through guided questionnaire 322, Guided questionnaire 322 is a series of questions or prompts designed to elicit further information from the user for designing an architectural solution within the constraints of a business analytics and optimization reference architecture and customer information technology environment. In one illustrative embodiment, guided questionnaire 322 is a drilldown questionnaire, designed to prompt the user for progressively more detailed information regarding for designing an architectural solution within the constraints of a business analytics and optimization reference architecture and customer information technology environment. Each subsequent question in the drilldown questionnaire can be based on responses to previous questions in the drilldown questionnaire, as well as customer functional and nonfunctional requirements 316.

Based on first level outputs 320, as well as customer responses to guided questionnaire 322, Configurator 310, with information/rules contained in repository 324, produces corresponding client specific components and subcomponents 324, a client specific solution Reference Architecture 326, and a page of reference links 328. Reference links 328 can include items such as but not limited to Points of View, Accelerators, Best Practices, and key performance indicators.

Figure 4A:
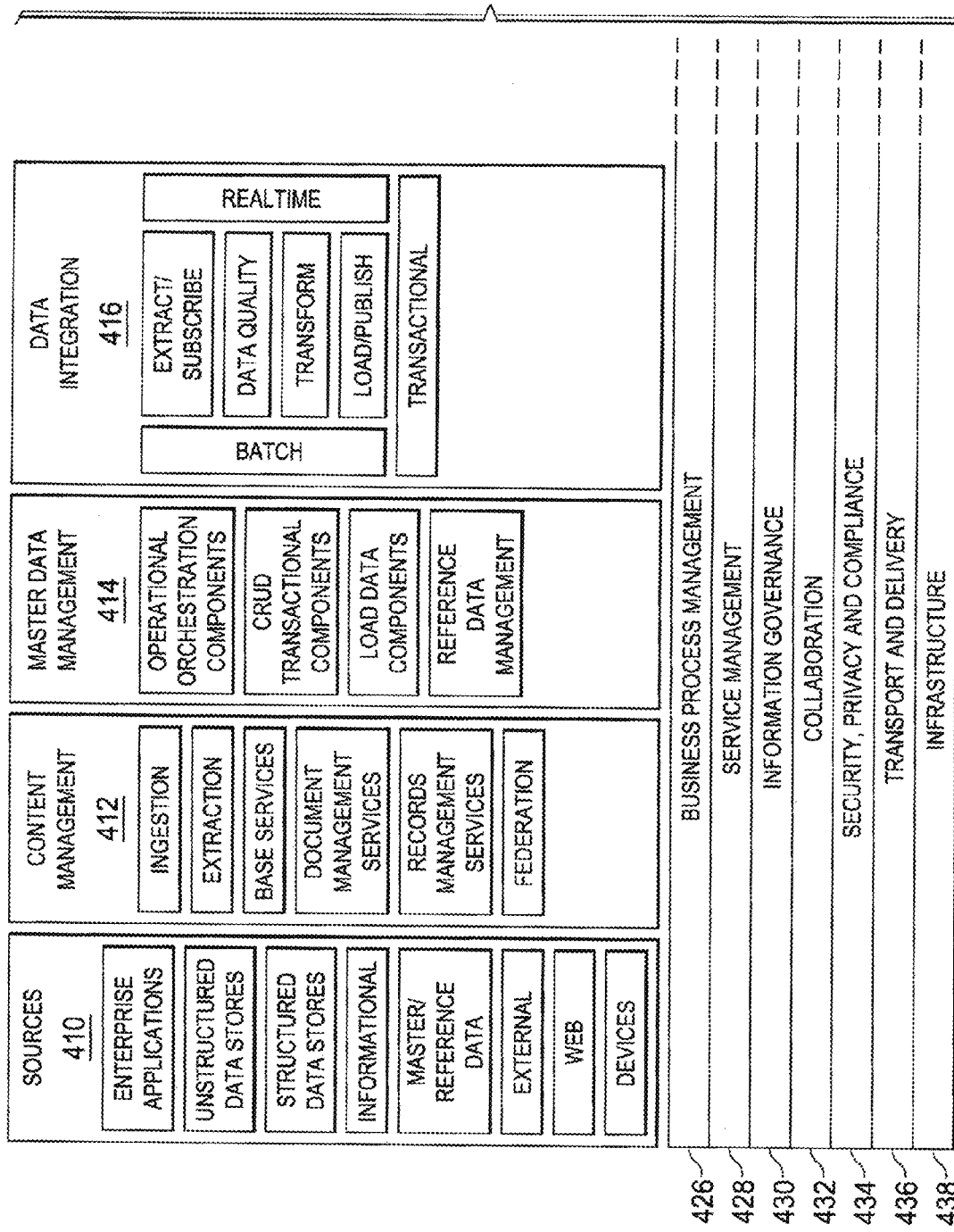
FIGS. 4A and 4B are reference architecture according to an illustrative embodiment.
Figure 4B:
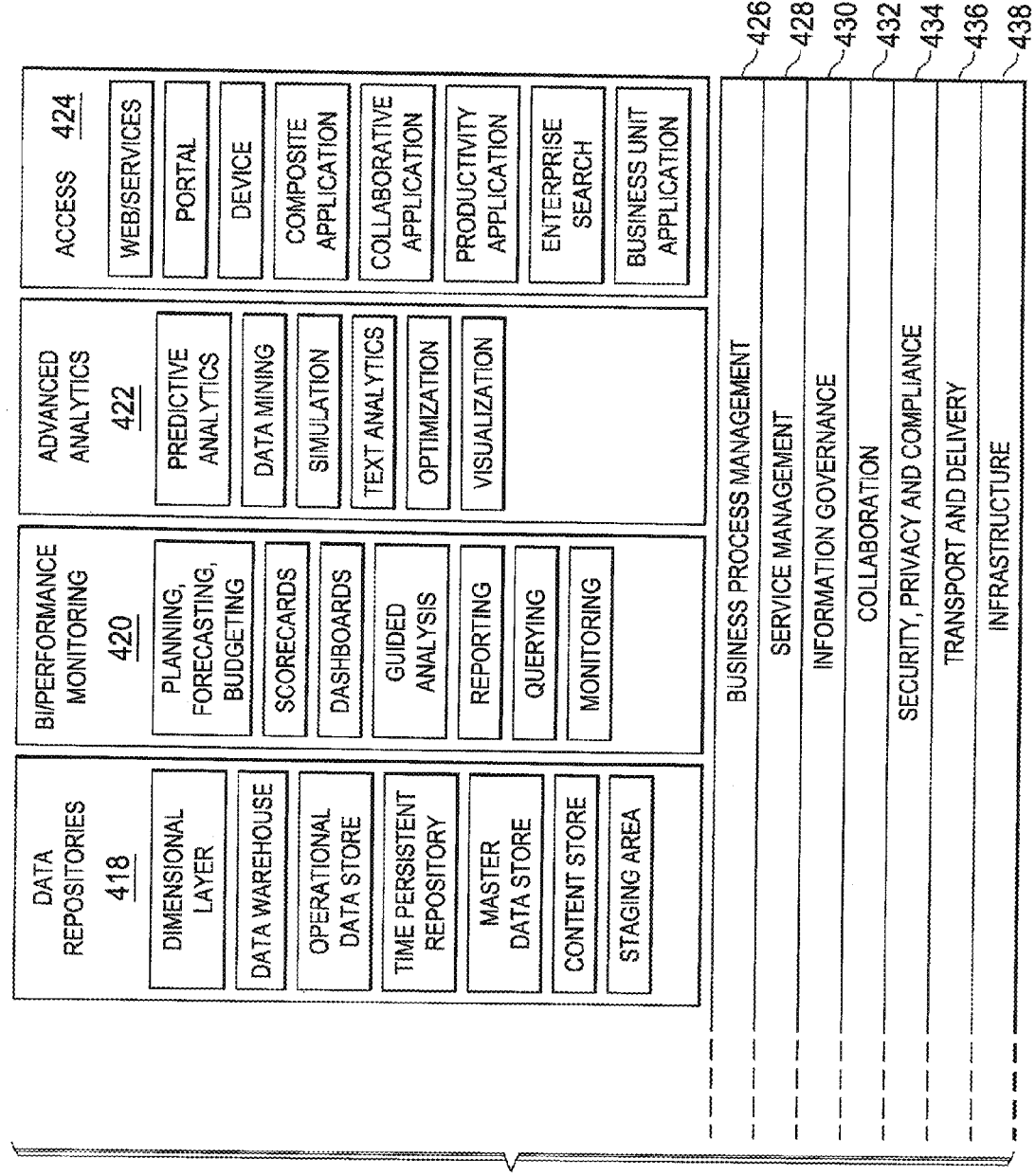

Referring now to FIG. 4, a reference architecture is shown according to an illustrative embodiment. Reference architecture 400 is reference architecture 312 of FIG. 3.

Reference architecture 400 includes sources layer 410. Sources layer 410 defines the main functional components that typically make up a comprehensive business analytics and optimization solution. It also categorizes components into similar components that can support a single solution set such as Enterprise Content Management or Master Data Management; but also has common shared components that support all solution sets, such as Data Integration, Data Repositories and Access.

Sources layer 410 can include sources such as but not limited to enterprise applications, unstructured data stores, structured data stores, informational sources, master/reference data, external sources, Web sources, and devices.

Reference architecture 400 includes content management layer 412. Content management layer 412 contains the services, technologies and processes used to capture, manage, store, preserve, and deliver unstructured content. Content management layer 412 provides global access and management of digital assets used to collaborate and share information between a company and its customers, suppliers, employees and business partners. Content management layer 412 can include services such as but not limited to content ingestion, content extraction, base services, document management services, records management services, and Federation.

Content Ingestion collects, classifies, analyzes, assigns metadata to and stores content into content stores. Content extraction is the set of processes that capture data, transactional or bulk, structured or unstructured, from various sources and lands it to an Initial Staging Area. It follows the architectural principle of "read once, write many" to ensure that impact on source systems is minimized, and data lineage is managed. The Initial Staging Area is an optional "landing zone" where the copy of the data from sources is landed because of content extraction. In an illustrative embodiment, the Initial Staging Area persists source data in non-volatile storage to achieve the "pull it once from source" goal. In any illustrative embodiment, Data from real time sources that is intended for real time targets only is not passed through content extraction and may not land in Initial Staging Area.

Base services are repository services that provide check in/out, versioning, permission management and enforcement, as well as higher-level application services. Document Management services provide lifecycle management, structured and collaborative authoring, automatic publishing, and support for multiple languages. Records Management services allow content and associated metadata to be treated as business records, which can be held or disposed of according to business needs. Federation provides consolidated search and retrieval of documents and metadata across multiple disparate content stores.

Reference architecture 400 includes master data management layer 414. Master data management layer 414 is a set of disciplines, technologies, and solutions to create and maintain consistent, complete, contextual, and accurate business data for all stakeholders across and beyond the enterprise. Master data management layer 414 includes a set of processes and tools that consistently define and manage the content entities of an organization. Master data management layer 414 provides processes for collecting, aggregating, matching, consolidating, quality assuring, persisting and distributing the content throughout an organization to ensure consistency and control in the ongoing maintenance and application use of this information. According to an illustrative embodiment, master data management layer 414 can include but is not limited to, operational orchestration components, CRUD transactional components, data load components, and reference data management.

Reference architecture 400 includes data integration layer 416. Data integration layer 416 focuses on the processes and environments that deal with the capture, qualification, processing, and movement of data in order to prepare it for storage in the Data Repository Layer 418, which is subsequently shared with the Analytical/Access applications and systems. Data integration layer 416 may process data in scheduled batch intervals or in near real-timer/"just-in-time" intervals, depending on the nature of the data and the business purpose for its use.

Data integration layer 416 can include but is not limited to extract/subscribe data quality, transform, and load/publish. Data integration layer 414 10 capture data via transactional, batch, and real-time data capturing.

Extract/Subscribe is the set of processes that capture data, transactional or bulk, structured or unstructured, from various sources and lands it to an Initial Staging Area. It follows the architectural principle of "read once, write many" to ensure that impact on source systems is minimized, and data lineage is managed.

Data Quality are the processes that qualifies and cleanses the data, based upon Technical and Business Process rules. Regardless of the data quality rules, the Data Quality Layer should provide the following functionality: Cleanse Data Files using the data quality criteria, Reject Data Files and data records that fail the cleansing logic, and provide a tabular report of the records that failed with reason codes for review and renovation.

Transformation refers to a set of well-defined processes that transform the data from a source format to a common target. Transformation can include Calculation and Split components, Processing and Enrichment components, and Filtering components.

Load/Publish refers to a set of standardized processes. Loads are structured by subject area by data store, for example, Subject Areas in the Data Warehouse such as Involved Party. There are five types of physical load architectures. FTP to Target is a load process that is only responsible for depositing the output to the target environment. Piped data is a load process that executes a load routine on the target that takes the data directly piped from the Target Specific Filter. RDBMS Utilities is a load process, for example, DB2's Bulk Loader on the target, but the source is Load-Ready Staging Area. SQL is a load process that writes directly to the target database. Message Publishing is a load process for loading real time data feeds to message queues Reference architecture 400 includes data repositories layer 418, Data Repository Layer 418 contains the databases and data stores and related components that provide most of the storage for the data that supports a business analytics and optimization environment. The Data Repositories Layer's repositories are not a replacement or replica of operational databases that reside on the Data Source Layer, but are a complementary set of data repositories that reshape data into formats necessary for making decisions and managing a business. These database structures are represented by conceptual, logical, and physical data models and data model types (e.g. 3NF, star/snowflake schemas, unstructured, etc.)

Data repositories layer 418 10 include, for example but not limited to, dimensional layer, data warehouse, operational data store, time persistent repository, master data store, content store, and staging area.

Dimensional Layer models are developed to support a single business function or process. It is usually a subset of information found in the data warehouse, further transformed and re-shaped for a specific analytical application. The dimensional model can contain both current and historical data, and typically contains summarized and aggregated data. Dimensional Layer models are also usually modeled as a star schema, or snowflake models. Dimensional Layer models can be instantiated as views, materialized views, or tables.

A Data Warehouse (DW) is the main store of analytic information. The DW provides business subject area orientation in order easily rationalize data from multiple subjects, such as different lines of business, and source systems. The data model is structured through its key designs to be able to accommodate updates either by traditional change data capture processes or snapshot updates. Because of the dynamic for multiple source system and business subject area integration, and change data capture, the optimal data model approach is 3rd Normal Form. These 3rd normal form Data Warehouse Models are not transactional in format, but designed for optimal loading and reading of analytic information. Data Warehouse may contain historical data, as well as rationalized transactional data, aggregated data, and derived/calculated data.

An Operational Data Store (ODS) is the main repository and integration point of operational data from disparate systems. The ODS stores transaction level detailed data used to satisfy common, integrated enterprise-level operational data needs. The ODS contains current, non-redundant detailed data common across multiple systems or organizational units. ODS's are often the data store structures used for Master Data Management Hub environments instantiating core subject areas such as Customer and Product.

Time Persistent Repositories (TPR) is structures that are modeled after the application data stores and databases, ft is a raw (no data quality flagging), siloed by application, source of transactional data. A TPR is used for operational reporting, data quality profiling, and sourcing for Advanced Analytic applications such as SAS and SPSS. They are "lightly conformed" enough in order to provide a common key structure in order to provide connectivity to data warehouses and dimensional layers.

Master Data contains the core business concepts and hierarchies of an organization such as suppliers, products, customers, and organization. The data stores are often are designed as an ODS data structure and are referenced by both analytic and transactional systems.

Content stores contain unstructured data such as text, video, documents and non-traditional relational formats such as XML. The design of these data stores using concepts such as content modeling is dependent on the planned business usage and underlying technology.

The staging area can include an initial staging area, a clean staging area, and a load-ready publish staging area.

Initial Staging is an optional "landing zone" where the copy of the data from sources is landed because of the extract/subscribe processing. One of the purposes for the Initial Staging Area is to persist source data in non-volatile storage to achieve the "pull it once from source" goal. Data from real time sources that is intended for real time targets only is not passed through Extract/Subscribe and may not land in Initial Staging Area.

The Clean Staging Area is the next optional landing zone, which contains records that have passed all DQ checks. This data may be passed to processes that build load ready files. The data may also become input to transformation processes that, in turn produce new data sets. The Data Integration architecture should include an archiving facility for the files in the clean staging area Load-Ready Publish is an optional staging area that is utilized to store target-specific load-ready files. If a target can take a direct output from a data integration tool without storing the data first, storing it in Load-ready Staging Area may not be required.

Reference architecture 400 includes business intelligence and performance management (BIPM) Layer 420. BIM Layer 420 empowers decision making and improved business performance through the timely access, analysis and reporting of actionable, accurate, and personalized information, A variety of applications may be supported, from static reporting to balanced scorecards to monitoring tools that are embedded within an operational process. This layer is typically composed of various technological components destined to meet specific needs, and are usually built from "best-of-breed" software and tools such as data access models, query tools, reporting tools for OLAP.

BIPM Layer 420 can include, for example but not limited to, planning/forecasting/budgeting, scorecards, dashboards, guided analysis, reporting, query, and monitoring.

Planning, Budgeting & Forecasting leverages analytics to align financial and operational plans, understand target values for key categories of revenue and expenditure, and evaluate expected business outcomes. It measures progress against leading industry best practices for identifying opportunities to better link strategy to action, optimize budget allocations, and perform what-if analysis.

Dashboards & Scorecards provide a mechanism to translate corporate strategy into measures, targets and initiatives across an organization and to achieve the visibility required to manage corporate performance, Dashboards are used by business managers to take immediate actions and improve day-to-day business performance. They have a limited time horizon and are updated weekly and/or daily. Dashboards typically use leading indicators, provide drilldown capabilities, and leverage business activity monitoring and exception alerts. Scorecards are used by executives to perform cross-functional monitoring of progress towards achieving business strategy. They usually leverage historical indicators and provide limited drilldown capabilities. Scorecards have a longer time horizon and are updated monthly/quarterly Business Analytics & Reporting provides the ability to connect disparate, disconnected, and non-integrated data from departmental and functionally siloed sources into a consistent, commonly defined and governed reporting format to enable timely and accurate analytical and reporting capabilities. It helps personalize information delivered to the user community and defines the "why" and "how" behind historically focused "what happened" analysis. Business Analytics & Reporting includes setting future direction, defining measures, targets, managing value drivers and analytic dimensions, enabling insight and vision around business events. It evaluates business requirements and current enterprise wide reporting processes in order to leverage the information architecture in the most effective and efficient manner across the organization BIPM Layer 420 Query refers to Relational ad doc query and reporting capabilities BIPM Layer 420 Monitoring refers to Operational reporting and real-time monitoring of key performance indicators (KPIs) and operational metrics Reference architecture 410 includes advanced analytic layer 422. Advanced Analytics Layer 422 uses data and models to provide insight to guide decisions. It empowers clients to make decisions that are more effective and build more productive systems based on more complete data, consideration of all available options, and careful predictions of outcomes and estimates of risk. This layer is typically composed of various technological components destined to meet specific needs, and are usually built from "best-of-breed" software and tools such as SPSS and ILOG.

In one illustrative embodiment, advanced analytics layer 422 includes predictive analytics, data mining, simulation, text analytics, optimization, and visualization.

Business Assessment within advanced analytics layer 422 involves understanding the business problem to be solved and determining the Advanced Analytics & Optimization technique best suited to address the client need. During this phase, business users, modelers, and domain experts work closely together to define the project objectives and the requirements from a business perspective. The project objective is then translated into a problem definition for predictive analytics & data mining, optimization & rules management, simulation, and/or visualization.

Data (lathering within advanced analytics layer 422 identifies and collects existing source information and prepares it for usage by subsequent analytical processes. During the data gathering, understanding the client business processes and analytical needs within context of their information environment is essential.

Data mining within advanced analytics layer 422 focuses on extracting patterns and previous unknown facts from large volumes of data. It helps businesses uncover key insights, patterns, and trends in data, and then uses this insight to optimize business decisions. Data mining techniques can be divided into major categories including classification (arranging data into predefined groups), clustering (similar to classification but the groups are not predefined), and regression (statistical analysis between a dependent variable and one or more independent variables).

Optimization within advanced analytics layer 422 helps companies improve operational efficiency while also providing centralized business rules in robust repositories that can be used across applications. Business Optimization leverages advanced mathematical techniques to find the best solution to a complex problem with many decision options and constraints. It is a powerful analytical tool for calculating the best possible utilization of resources to help achieve a desired business result, such as reducing cost or processing time, or increasing profit, serviceability and throughput.

Predictive Analytics within advanced analytics layer 422 Analyzes patterns found in historical and current transaction data as well as attitudinal survey data to predict potential future outcomes. The core of predictive analytics relies on capturing relationships between explanatory variables and developing models to predict future outcomes.

Rules Management within advanced analytics layer 422 is used to define, deploy, execute, monitor, and maintain the variety and complexity of business logic that are used by operational systems within an organization. Business rules are typically written using IF/THEN statements, decision tables, decision trees and scorecards. Business rules describe the operations, business logic, and constraints that apply to an organization in achieving its goals.

Simulation within advanced analytics layer 422 replicates a system, process, behavior, or business problem using advanced analytical techniques. It is used to perform "What If" analysis based on a set of parameters and input variables. Simulation models a business process to estimate the impact of management decisions or changes. Simulation enables companies to reproduce the dynamic behavior of a business process, in order to analyze workloads and potential bottlenecks. Simulations are an example of how technology can aid smarter decision-making. It can predict, for example, what will happen to an area if a new major facility is built and lead to improved planning of roads and public transportation. By providing insight into the impact of decisions and design alternatives, simulation can help companies determine the optimal path forward.

Text Analytics within advanced analytics layer 422 is the analysis of textual patterns to provide business insight. Infers meaning from unstructured data.

Visualization within advanced analytics layer 422 allows clients to gain insight through diagrams, maps, schedules, charts, and images. Visualization techniques manipulate, transform, and render data based on points, lines, areas, volumes, images or geometric primitives in any combination. Visualization is a powerful tool for understanding the behavior of complex systems. By building graphical displays, users can easily understand and interpret large volumes of data. Visualization is applicable to a wide range of business problems including financial trend analysis, monitoring of traffic and communication system, analysis of social networks, and arrangement of large-scale text and image data.

Reference architecture 410 includes access layer 424. Access Layer provides the mechanism for end user or external system interaction with the analytical, informational, and reporting applications of the Information on Demand environment. The interaction may be human or automated through a web service In one illustrative embodiment, access layer 424 can include, for example but is not limited to, Web services, portal, device, composite application, collaborative application, productivity application, enterprise search, and business unit application.

Web Browsers within access layer 424 are software front end applications used for retrieving and presenting information on the internet Portals within access layer 424 are methods of consolidating multiple information sources on one site with common access control Devices within access layer 424 include any device attached to another computer or computing device that extends its functionality. The device has the ability to transmit and receive information Web Services within access layer 424 is A service or set of services that can be accessed via the internet or other computing processing methods and provide content, information or processing services In an illustrated embodiment, reference architecture 400 includes one or more cross layers. The Cross Layer provides the cohesive foundation whereupon the business analytics and optimization pillars can function in an integrated and seamless fashion.

Reference architecture 400 includes business process management cross layer 426. Business Process Management cross layer 426 is a management approach based on continually improving and optimizing business processes using business value and technology as drivers utilizing a systematic approach for continuous improvement.

Reference architecture 400 includes service management cross layer 428. Service management cross layer 428 is a broad set of disciplines that better aligns the technology investments with the business objectives. The goal is to continually enhance and optimize the information technology infrastructure, applications, policies and procedures so that as it is improved, refurbished, and enhanced to support the business, it is implemented with precision, minimal impact and continually improving service delivery results.

Reference architecture 400 includes information Governance cross layer 430: The orchestration of people, process, and technology enable an organization to leverage data as an enterprise asset. Information Governance cross layer 430 allows organizations to be more consistent, coherent, and comprehensive in the way they define, discuss, analyze, and leverage data in their environment to achieve business objectives.

Reference architecture 400 includes collaboration cross layer 432. Collaboration cross layer 432 enables people to find the right people or information when they need it. Effective collaboration helps people work smarter and drive business benefits by deepening valuable relationships, making better decisions faster, spurring innovation, and reducing costs. Through the effective implementation of comprehensive collaboration solutions, organizations benefit by:

Building and strengthening relationships with partners and customers

Improving workforce productivity through better, faster decisions a. Increasing innovation by tapping into collective intelligence b. Enabling new and cost-effective ways for people to work.

Reference architecture 400 includes security, privacy, and compliance layer 434. Security, privacy, and compliance layer 434 describes the policies, practices and controls used by an organization to mitigate risk and protect data assets. It also includes the methodology by which risks are identified, qualified, quantified, avoided, accepted, mitigated or transferred out. In addition, compliance management helps reduce costs and overall risks associated with legal and regulatory edicts and enables quicker and more complete responses to legal and/or government inquiries helping improve overall compliance capabilities and ensuring maximum transparency. Security, Privacy and Compliance are classified into three broad subject areas: Information Security & Privacy, Data Risk Management, and Compliance.

Reference architecture 400 includes transport and delivery layer 436. Transport and delivery layer 436 enables information sharing, authoring, and analytics in a collaborative and timely manner, centered around the concept of managing a data flow through an MPP parallel data integration framework, data flow messaging, and DTI'S distributed transaction processing. Transport and Deliver can be driven with MPP Parallel Data Flow and Stream Frameworks, through a managed data exchange bus, or enterprise service bus; with collaborative and action-based feedback processes.

Reference architecture 400 includes infrastructure layer 438. Infrastructure layer 438 is the physical hardware, foundational software such as operating systems, security protocols, data storage, network connectivity, etc. that is considered the foundation for the business analytics and optimization platform needed to build the specific applications that will allow the suite of applications to interact with the end user community.

Figure 5C:
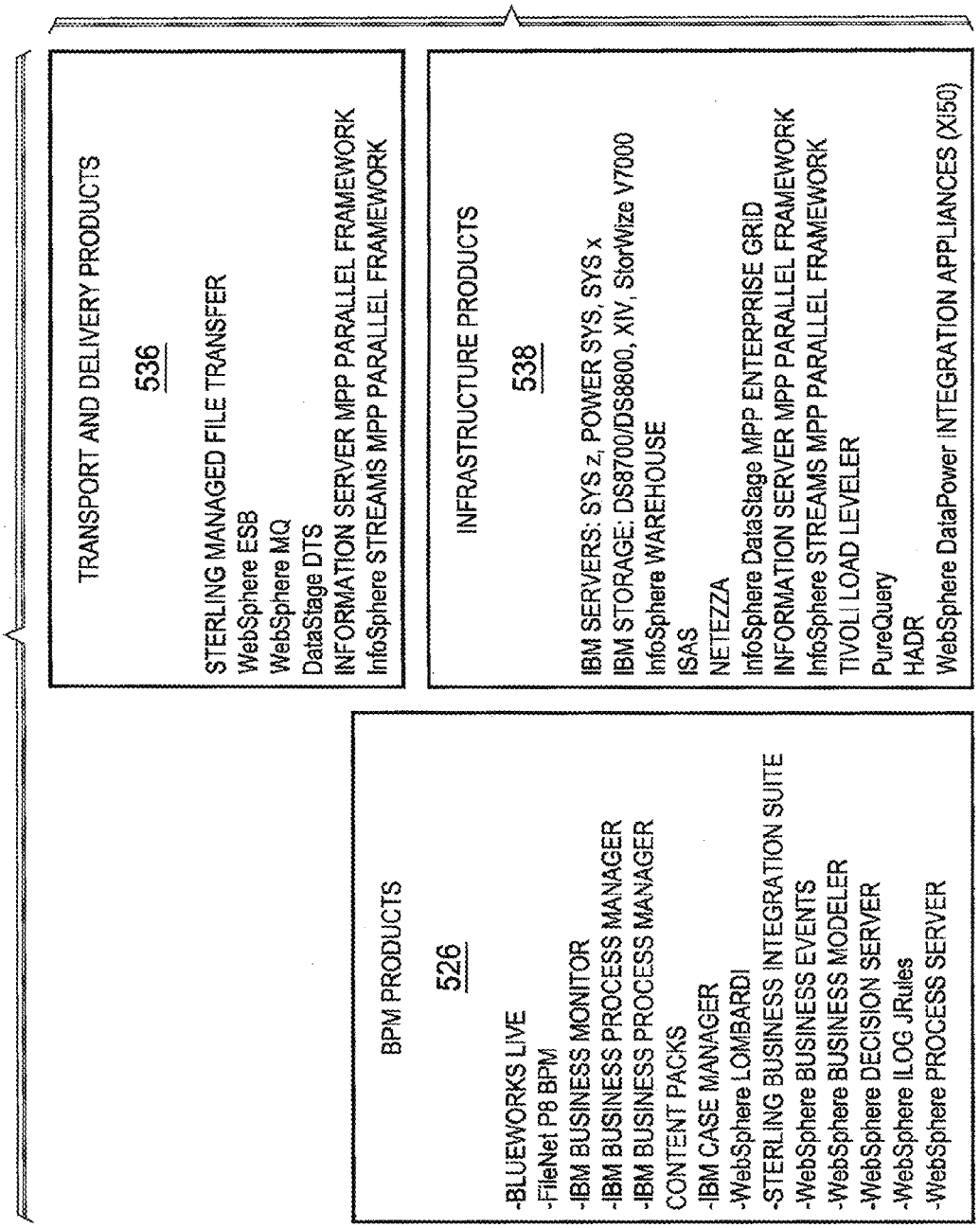
Figure 5D:
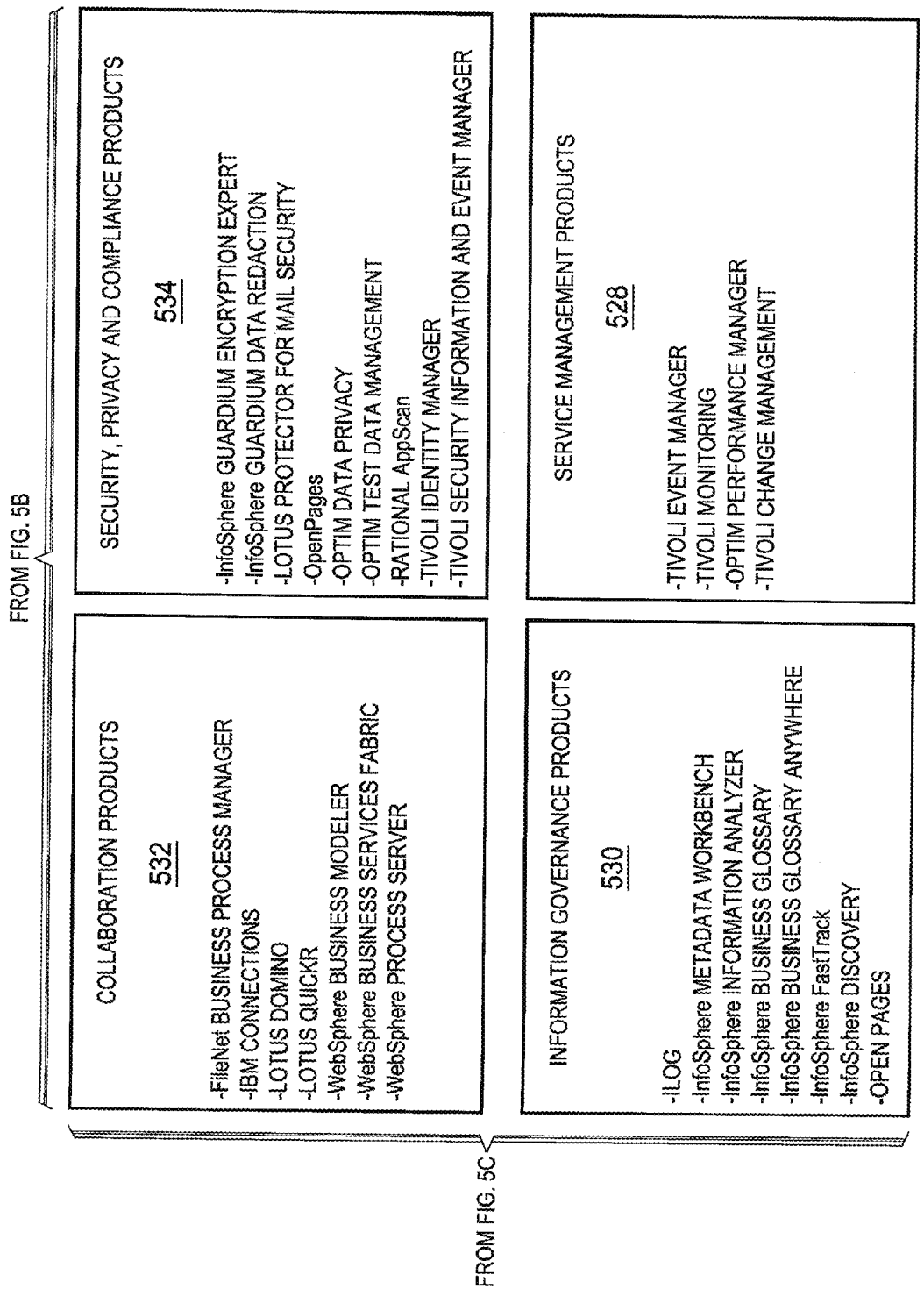

Referring now to FIG. 5, a product overlay is shown according to an illustrative embodiment. Product overlay 500 is product overlay 314 FIG. 3. Product overlay 500 is a representation of the various available products utilized to implement various layers of reference architecture, such as reference architecture 312 FIG. 3. Based on customer functional and nonfunctional requirements as well as further input received through a guided questionnaire (4) based on the first pass of configurator output, configurator 310 can recommend available products for designing an architectural solution within the constraints of a business analytics and optimization reference architecture and customer information technology environment.

Product overlay 500 includes sources layer 510, Sources layer 510 include products such as but not limited to enterprise applications, unstructured data stores, structured data stores, informational sources, master/reference data, external sources, Web sources, and devices.

Sources layer 510 can include, for example but is not limited to, products such as DB2 z/OS, DB2 LUW, IMS, Informix, and VSAM.

Product overlay 500 includes content management layer 512. Content management layer 512 is a listing of products that provide services, technologies and processes used to capture, manage, store, preserve, and deliver unstructured content. Products within content management layer 512 provide global access and management of digital assets used to collaborate and share information between a company and its customers, suppliers, employees and business partners. Products within content management layer 512 can provide services such as but not limited to content ingestion, content extraction, basic services, document management services, records management services, and Federation.

Content management layer 512 can include, for example but not limited to, products such as Classification Module, Content Analyzer, Content Collector, Content Integrator, Content Manager, Content Manager OnDemand, Datacap, Document Manager, Enterprise Records, FileNet Capture, FileNet Content Services, FileNet Content Manager, FileNet P8, Enterprise Management, WebSphere information integrator Content Edition, OmniFind, and Records Manager.

Content overlay 500 includes master data management layer 514. Master data management layer 514 is a listing of products that provide disciplines, technologies, and solutions to create and maintain consistent, complete, contextual, and accurate business data for all stakeholders across and beyond the enterprise. Products within master data management layer 514 consistently define and manage the content entities of an organization. Products within master data management layer 514 provide processes for collecting, aggregating, matching, consolidating, quality assuring, persisting and distributing the content throughout an organization to ensure consistency and control any ongoing maintenance and application for use of this information. Products within master data management layer 514 provide operational orchestration components. CRUD transactional components, data load components, and reference data management.

Master data management layer 514 can include, for example but not limited to, products such as InfoSphere Identity Insight Solutions, InfoSphere Master Information Hub, InfoSphere MDM Server, InfoSphere MDM Server for PIM, InfoSphere Traceability Server, and Initiate Master Data Service.

Product overlay 500 includes data integration layer 516. Products within integration layer 516 focus on the processes and environments that deal with the capture, qualification, processing, and movement of data in order to prepare it for storage in the data repository layer, such as a repository layer 418 FIG. 4. Products within data integration layer 516 may process data in scheduled batch intervals or in near real-time/"just-in-time" intervals, depending on the nature of the data and the business purpose for its use.

Products within data integration layer 516 can provide services to extract/subscribe, data quality, transform, and load/publish. Products within data integration layer 516 can capture data via transactional, batch, and real-time data capturing.

Data integration layer 516 can include, for example but not limited to, products such as Information Server, InfoSphere DataStage, InfoSphere Data Stage DTS (Transactional), InfoSphere Change Data Capture, InfoSphere Federation Server, InfoSphere QualityStage, IBM Global Name Recognition (GNR), IBM Mashup Center, InfoSphere Streams, WebSphere Process Server, WebSphere Message Broker, Cognos 8 Virtual View Manager, Cognos Data Manager, and InfoSphere Foundation Tools.

Product overlay 500 includes data repositories layer 518. Products within Data. Repository Layer 518 provide the databases and data stores and related components that provide most of the storage for the data that supports a business analytics and optimization environment. Products within Data Repository Layer 518 provide a complementary set of data repositories that reshape data into formats necessary for making decisions and managing a business. These database structures are represented by conceptual, logical, and physical data models and data model types (e.g. 3NF, star/snowflake schemas, unstructured, etc.)

Products within data repositories layer 518 can include, for example but not limited to, dimensional layer products, data warehouse products, operational data store products, time persistent repository products, master data store products, content store products, and staging area products.

Data repositories layer 518 can include, for example but not limited to, products such as Big Insights (Apache Hadoop), DB2 LUW, DB2 z/OS, FileNet Content Manager, Content Manager, IBM Banking Data Warehouse (BDW), IBM Financial Markets Data Warehouse, IBM Insurance information Warehouse (IIW), IBM Retail Data Warehouse, IBM Telecommunications Data Warehouse (TDW), IDS, IMS, Informix TimeSeries DataBlade, InfoSphere Warehouse, ISAS, Netezza, Optim Data Growth, InfoSphere Data Architect, and SolidDB.

Product overlay 500 includes business intelligence and performance management (BIPM) Layer 520. Products within BIPM Layer 420 empower decision making and improved business performance through the timely access, analysis and reporting of actionable, accurate, and personalized information. A variety of applications may be supported, from static reporting to balanced scorecards to monitoring tools that are embedded within an operational process. Products within BIPM layer 520 are various technological components destined to meet specific needs, and are usually built from "best-of-breed" software and tools such as data access models, query tools, reporting tools for OLAP.

Products within RIM Layer 520 can include, for example but not limited to, products providing planning/forecasting/budgeting, products providing scorecards, products providing dashboards, products providing guided analysis, products providing reporting, products providing query, and products providing monitoring.

BIPM Layer 520 can include, for example but not limited to, products such as Cognos BI, Cognos Now!, Cognos Planning, Cognos TM1, e-Discovery Analyzer, FileNet System Monitor, IBM Classification Module, IBM Mashup Center, ILOG, InfoSphere Cubing Services, SPSS, IBM Business Monitor, Web Sphere Portal, and WebSphere sMash.

Product overlay 500 includes advanced analytic layer 522. Products within Advanced Analytics Layer 522 use data and models to provide insight to guide decisions. They empower clients to make decisions that are more effective and build more productive systems based on more complete data, consideration of all available options, and careful predictions of outcomes and estimates of risk. Products within can include are destined to meet specific needs, and are usually built from "best-of-breed" software and tools such as SPSS and ILOG.

In one illustrative embodiment, products within advanced analytics layer 522 include predictive analytics, data mining, simulation, text analytics, optimization, and visualization. Advanced analytics layer 522 can include, for example but not limited to, products such as Cognos, Coremetrics, ILOG, InfoSphere Global Name Analytics, SPSS, TM1, and Unica Enterprise.

Product related 500 includes access layer 524. Products within access layer 524 provide the mechanism for end user or external system interaction with the analytical, informational, and reporting applications of the Information on Demand environment. The interaction may be human or automated through a web service.

In one illustrative embodiment, products and access layer 524 can provide, for example but is not limited to, Web services, portal, device, composite application, collaborative application, productivity application, enterprise search, and business unit application. Access layer 524 can include, for example but not limited to, products such as Business Glossary Anywhere, Cognos Analysis for Excel, Cognos Analytical Applications, Cognos Controller, Cognos Go! Mobile, Cognos Go! Office, Cognos Go! Search, e-Discovery Manager, InfoSphere eDiscovery Manager, OmniFind Enterprise Edition, OmniFind Search, and WebSphere Portal.

Product overlay 500 business process management cross layer 526. Products within Business Process Management cross layer 426 provide a management approach based on continually improving and optimizing business processes using business value and technology as drivers utilizing a systematic approach for continuous improvement. This process management cross layer 526 can include, for example but not limited to, products such as Blueworks Live, FileNet P8 BPM, IBM Business Monitor, IBM Business Process Manager, IBM Business Process Manager Content Packs, IBM Case Manager, WebSphere Lombardi, Sterling Business Integration Suite, WebSphere Business Events, WebSphere Business Modeler, WebSphere Decision Server, WebSphere ILOG JRules, and WebSphere Process Server.

Product overlay 500 includes service management cross layer 528. Products within service management cross layer 528 provide a broad set of disciplines that better aligns the technology investments with the business objectives. The goal of service management cross layer 528 is to continually enhance and optimize the information technology infrastructure, applications, policies and procedures so that as the information technology infrastructure, applications, policies and procedures are improved, refurbished, and enhanced to support the business, the information technology infrastructure, applications, policies and procedures are implemented with precision, minimal impact and continually improving service delivery results. Service management cross layer 528 can include, for example but not limited to, products such as Tivoli Event Manager, Tivoli Monitoring, Optimum Performance Manager, and Tivoli Change Management.

Product overlay 500 includes Information Governance cross layer 530. The orchestration of people, process, and technology to enable an organization to leverage data as an enterprise asset. Products within Information Governance cross layer 530 allow organizations to be more consistent, coherent, and comprehensive in the way they define, discuss, analyze and leverage data in their environment to achieve business objectives. Information governance cross layer 530 can include, for example but not limited to, products such as ILOG, InfoSphere Metadata Workbench, InfoSphere Information Analyzer, InfoSphere Business Glossary, InfoSphere Business Glossary Anywhere, InfoSphere FastTrack, InfoSphere Discovery, and Open Pages.

Product overlay 500 includes collaboration cross layer 532. Products within collaboration cross layer 532 enable people to find the right people or information when they need it. Effective collaboration helps people work smarter and drive business benefits by deepening valuable relationships, making better decisions faster, spurring innovation, and reducing costs. Through the effective implementation of comprehensive collaboration solutions, organizations benefit by:

Building and strengthening relationships with partners and customers

Improving workforce productivity through better, faster decisions

Increasing innovation by tapping into collective intelligence

Enabling new and cost-effective ways for people to work. Collaboration cross layer 532 can include, for example but not limited to, products such as FileNet Business Process Manager, IBM Connections, Lotus Domino, Lotus Quickr, WebSphere Business Modeler, WebSphere Business Services Fabric, and WebSphere Process Server.

Product overlay 500 includes security, privacy, and compliance layer 534. Security, privacy, and compliance layer 534 describes the policies, practices and controls used by an organization to mitigate risk and protect data assets. It also includes the methodology by which risks are identified, qualified, quantified, avoided, accepted, mitigated or transferred out. In addition, compliance management helps reduce costs and overall risks associated with legal and regulatory edicts and enables quicker and more complete responses to legal and/or government inquiries helping improve overall compliance capabilities and ensuring maximum transparency. Security, privacy, and compliance layer 534 can include, for example but not limited to, products such as InfoSphere Guardium Encryption Expert, InfoSphere Guardium Data Redaction, Lotus Protector for Mail Security, OpenPages, Optim Data Privacy, Optim Test Data Management, Rational AppScan, Tivoli Identity Manager, and Tivoli Security Information and Event Manager.

Product overlay 500 includes transport and delivery layer 536. Transport and delivery layer 536 enables information sharing, authoring, and analytics in a collaborative and timely manner, centered around the concept of managing a data flow through an MPP parallel data integration framework, data flow messaging, and DTS distributed transaction processing. Transport and Deliver can be driven with MPP Parallel Data Flow and Stream Frameworks, through a managed data exchange bus, or enterprise service bus; with collaborative and action-based feedback processes. Transport and delivery layer 536 can include, for example but not limited to, products such as Sterling Managed File Transfer, WebSphere ESB, WebSphere MQ, DataStage DTS, Information Server MPP Parallel Framework, and InfoSphere Streams MPP Parallel Framework Product overlay 500 includes infrastructure layer 538, Infrastructure layer 538 is the physical hardware, foundational software such as operating systems, security protocols, etc, data storage and network connectivity that is considered the foundation for the business analytics and optimization platform that is needed to build the specific applications that will allow the suite of applications to interact with the end user community. A key consideration in the business analytics and optimization arena is the development of workload optimized systems and appliances that are designed and built for specific purposes. Infrastructure layer 538 can include, for example but not limited to, products such as IBM Servers: Sys z, Power Sys, Sys x, IBM Storage: DS8700/DS8800, XIV, StorWize V7000, InfoSphere Warehouse, ISAS, Netezza, InfoSphere DataStage MPP Enterprise GRID, Information Server MPP Parallel Framework, InfoSphere Streams MPP Parallel Framework, Tivoli Load Leveler, PureQuery, HADR, and WebSphere DataPower Integration Appliances (XI50).

Figure 6:
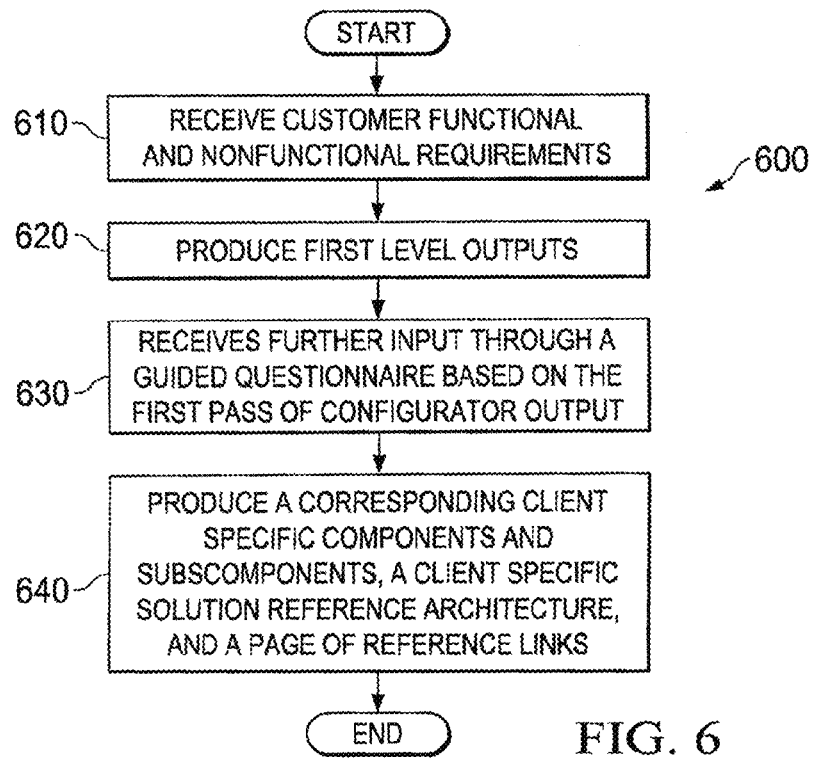
FIG. 6 is a flowchart of a process for designing an architectural solution within the constraints of a business analytics and optimization reference architecture and customer information technology environment according to an illustrative embodiment.

Referring now to FIG. 6, a flowchart of a process for designing an architectural solution within the constraints of a business analytics and optimization reference architecture and customer information technology environment is shown according to an illustrative embodiment. Process 600 is a software process executing on a software component, such as configurator 310 of FIG. 3.

Process 600 begins by receiving customer functional and nonfunctional requirements (step 610). The customer functional and nonfunctional requirements can be functional and nonfunctional requirements 316 of FIG. 3, The customer functional and nonfunctional requirements can be received, for example but not limited to, through a web interface. The web interface can be, for example but not limited to, interface 318 of FIG. 3.

Responsive to receiving customer functional and nonfunctional requirements, process 600 produces first level outputs (step 620). The first level outputs include reference architecture pillars and layers needed to implement the architectural solution within the constraints of the business analytics and optimization reference architecture and customer information technology environment. The first level outputs can be, for example but not limited to first level outputs 320 of FIG. 3. The reference architecture pillars and layers can include, for example but not limited to, the various layers and cross layers described in FIG. 4. The layers can include, for example sources layer 410 of FIG. 4, content management layer 412 of FIG. 4, master data management layer 414 of FIG. 4, a data integration layer 416 of FIG. 4, data repositories layer 418 of FIG. 4, MA/performance monitoring layer 420 of FIG. 4, advanced analytics layer 422 of FIG. 4, and access layer 424 of FIG. 4. The cross layers can include business process management cross layer 426 FIG. 4, service management cross layer 428 FIG. 4, information governance cross layer 430 FIG. 4, collaboration cross layer 432 FIG. 4, security, privacy, & compliance cross layer 434 FIG. 4, transport & delivery cross layer 436 FIG. 4, and infrastructure cross layer 438 FIG. 4.

Responsive to producing the first level outputs, process 600 receives further input through a guided questionnaire based on the first pass of configurator output (step 630). The guided questionnaire can be, for example but not limited to, guided questionnaire 322 of FIG. 3. The Guided questionnaire is a series of questions or prompts designed to elicit further information from the user for designing an architectural solution within the constraints of a business analytics and optimization reference architecture and customer information technology environment. In one illustrative embodiment, the guided questionnaire is a drilldown questionnaire, designed to progressively prompt the user for more detailed information regarding for designing an architectural solution within the constraints of a business analytics and optimization reference architecture and customer information technology environment, Each subsequent question in the drilldown questionnaire can be based on responses to previous questions in the drilldown questionnaire, as well as customer functional and nonfunctional requirements.

Responsive to receiving further input through a guided questionnaire, process 600 produces a corresponding client specific components and subcomponents, a client specific solution Reference Architecture, and a page of reference links (step 640), with the process terminating thereafter. The client specific components and subcomponents can be, for example but not limited to client specific components and subcomponents 324 of FIG. 3, The client specific solution reference architecture can be, for example but not limited to client specific solution reference architecture 326 of FIG. 3, The page of reference links can be, for example but not limited to, page of reference links 328 of FIG. 3. The Reference links can include items such as but not limited to Points of View, Accelerators, Best Practices, and key performance indicators.

The illustrative embodiments described herein provide a computer implemented method, a computer program product, and a data processing system for designing an architectural solution within the constraints of a business analytics and optimization reference architecture and customer information technology environment. A computer implemented method, a data processing system, and a computer program product are provided for designing an architectural solution. Functional requirements and nonfunctional requirements of the architectural solution are received. Responsive to receiving the functional requirements and nonfunctional requirements, first level outputs are produced. Further input is received through a guided questionnaire based on the first level outputs. Responsive to receiving the further input, a list of client specific components and subcomponents, a client specific solution reference architecture, and a set of reference links is produced.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for designing an architectural solution, the method comprising:
   receiving, by a computer, functional requirements and nonfunctional requirements;
   responsive to receiving the functional requirements and nonfunctional requirements, producing, by the computer, first level outputs;
   receiving, by the computer, further input through a guided questionnaire, wherein the guided questionnaire is based on the first level outputs; and
   responsive to receiving the further input, producing, by the computer, a list of client specific components and subcomponents, a client specific solution reference architecture, and a set of reference links,
   wherein the architectural solution is designed within the constraints of a business analytics and optimization reference architecture and customer information technology environment,
   wherein the business analytics and optimization reference architecture comprises a predefined architectural pattern and supporting artifacts to enable use of the predefined architectural pattern,
   wherein the predefined architectural pattern comprises a set of layers, a set of cross layers, or both the set of layers and the set of cross layers,
   wherein the predefined architectural pattern comprises the set of cross layers, wherein the set of cross layers comprises a business process management cross layer, a service management cross layer, an information governance cross layer, a collaboration cross layer, a security, privacy, and compliance cross layer, a transport and delivery cross layer, and infrastructure cross layer,
   wherein the business process management cross layer includes a management approach based on continually improving and optimizing business processes using business value and technology as drivers,
   wherein the service management cross layer includes a set of disciplines that aligns technology investments with business objectives,
   wherein the information governance cross layer defines data in a consistent, coherent, and comprehensive way to achieve business objectives,
   wherein the collaboration cross layer enables finding people and information,
   wherein the security, privacy, and compliance cross layer describes policies, practices and controls used to mitigate risk and protect data assets,
   wherein the transport and delivery cross layer enables information sharing, authoring, and analytics in a collaborative manner, and
   wherein the infrastructure cross layer includes a listing of hardware, and software needed to build the architectural solution.

2. The method of claim 1, wherein the predefined architectural pattern comprises the set of layers, wherein the set of layers further comprises a sources layer, a content management layer, a master data management layer, a data integration layer, a data repositories layer, a business intelligence and performance management layer, an advanced analytics layer, and an access layer.

3. A computer program product for designing an architectural solution, the computer program product comprising:
   one or more computer-readable hardware memories;
   program instructions, stored on at least one of the one or more storage devices, to receive functional requirements and nonfunctional requirements;
   program instructions, stored on at least one of the one or more storage devices, responsive to receiving the functional requirements and nonfunctional requirements, to produce first level outputs;
   program instructions, stored on at least one of the one or more storage devices, to receive further input through a guided questionnaire, wherein the guided questionnaire is based on the first level outputs; and
   program instructions, stored on at least one of the one or more storage devices, responsive to receiving the further input, to produce a list of client specific components and subcomponents, a client specific solution reference architecture, and a set of reference links,
   wherein all of said program instructions are configured to be executed by one or more processors via one or more computer-readable hardware memories,
   wherein the architectural solution is designed within the constraints of a business analytics and optimization reference architecture and customer information technology environment,
   wherein the business analytics and optimization reference architecture comprises a predefined architectural pattern and supporting artifacts to enable use of the predefined architectural pattern,
   wherein the predefined architectural pattern comprises a set of layers, a set of cross layers, or both the set of layers and the set of cross layers,
   wherein the predefined architectural pattern comprises the set of cross layers, wherein the set of cross layers comprises a business process management cross layer, a service management cross layer, an information governance cross layer, a collaboration cross layer, a security, privacy, and compliance cross layer, a transport and delivery cross layer, and infrastructure cross layer,
   wherein the business process management cross layer includes a management approach based on continually improving and optimizing business processes using business value and technology as drivers,
   wherein the service management cross layer includes a set of disciplines that aligns technology investments with business objectives,
   wherein the information governance cross layer defines data in a consistent, coherent, and comprehensive way to achieve business objectives,
   wherein the collaboration cross layer enables finding people and information,
   wherein the security, privacy, and compliance cross layer describes policies, practices and controls used to mitigate risk and protect data assets,
   wherein the transport and delivery cross layer enables information sharing, authoring, and analytics in a collaborative manner, and
   wherein the infrastructure cross layer includes a listing of hardware, and software needed to build the architectural solution.

4. The computer program product of claim 3, wherein the predefined architectural pattern comprises the set of layers, wherein the set of layers further comprises a sources layer, a content management layer, a master data management layer, a data integration layer, a data repositories layer, a business intelligence and performance management layer, an advanced analytics layer, and an access layer.

5. A computer system for designing an architectural solution, the computer system comprising:
one or more processors, one or more computer-readable memory devices, and one or more computer-readable hardware memories;
program instructions, stored on at least one of the one or more computer-readable hardware memories for execution by at least one of the one or more processors via at least one of the one or more memory devices, to receive functional requirements and nonfunctional requirements;
program instructions, stored on at least one of the one or more computer-readable hardware memories for execution by at least one of the one or more processors via at least one of the one or more memory devices, responsive to receiving the functional requirements and nonfunctional requirements, to produce first level outputs;
program instructions, stored on at least one of the one or more computer-readable hardware memories for execution by at least one of the one or more processors via at least one of the one or more memory devices, to receive further input through a guided questionnaire, wherein the guided questionnaire is based on the first level outputs; and
program instructions, stored on at least one of the one or more computer-readable hardware memories for execution by at least one of the one or more processors via at least one of the one or more memory devices, responsive to receiving the further input, to produce a list of client specific components and subcomponents, a client specific solution reference architecture, and a set of reference links,
wherein all of said program instructions are configured to be executed by the one or more processors via the one or more computer-readable memory devices,
wherein the architectural solution is designed within the constraints of a business analytics and optimization reference architecture and customer information technology environment,
wherein the business analytics and optimization reference architecture comprises a predefined architectural pattern and supporting artifacts to enable use of the predefined architectural pattern,
wherein the predefined architectural pattern comprises a set of layers, a set of cross layers, or both the set of layers and the set of cross layers,
wherein the predefined architectural pattern comprises the set of cross layers, wherein the set of cross layers comprises a business process management cross layer, a service management cross layer, an information governance cross layer, a collaboration cross layer, a security, privacy, and compliance cross layer, a transport and delivery cross layer, and infrastructure cross layer,
wherein the business process management cross layer includes a management approach based on continually improving and optimizing business processes using business value and technology as drivers,
wherein the service management cross layer includes a set of disciplines that aligns technology investments with business objectives,
wherein the information governance cross layer defines data in a consistent, coherent, and comprehensive way to achieve business objectives,
wherein the collaboration cross layer enables finding people and information,
wherein the security, privacy, and compliance cross layer describes policies, practices and controls used to mitigate risk and protect data assets,
wherein the transport and delivery cross layer enables information sharing, authoring, and analytics in a collaborative manner, and
wherein the infrastructure cross layer includes a listing of hardware, and software needed to build the architectural solution.

6. The computer system of claim 5, wherein the predefined architectural pattern comprises the set of layers, wherein the set of layers further comprises a sources layer, a content management layer, a master data management layer, a data integration layer, a data repositories layer, a business intelligence and performance management layer, an advanced analytics layer, and an access layer.

* * * * *